Aug. 28, 1951
J. N. PRYOR
2,565,627
COPRECIPITATED SILICA-MAGNESIA GEL
Filed April 5, 1946
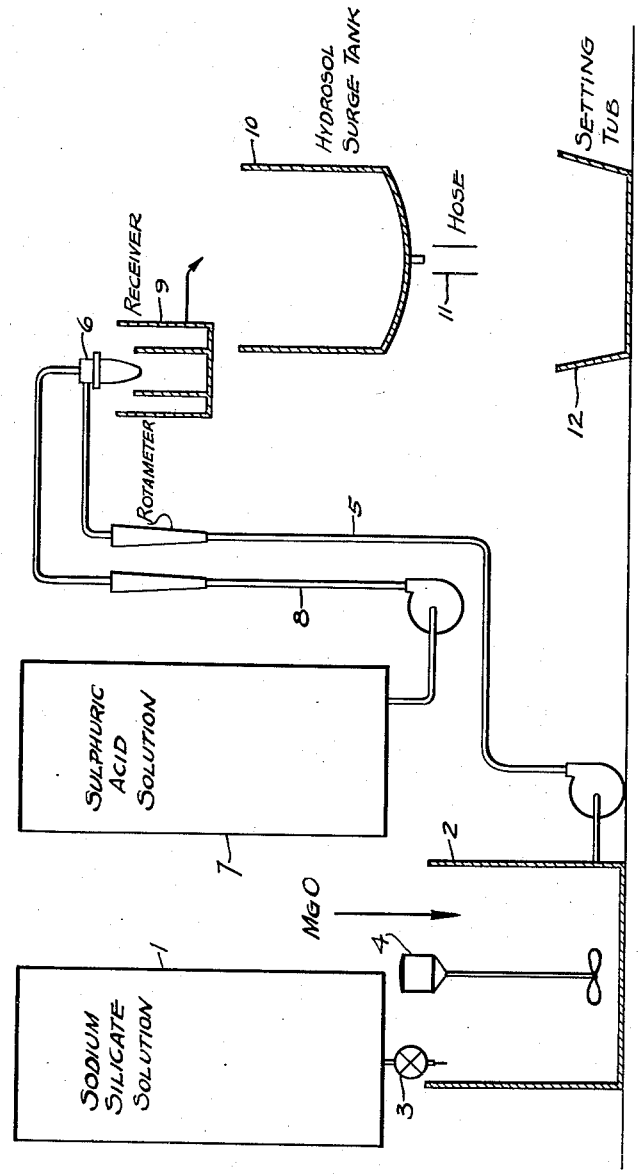
Inventor
JAMES N. PRYOR
By Semmes, Keegin, Peale and Semmes
Attorney Patented Aug. 28, 1951

2,565,627

UNITED STATES PATENT OFFICE 2,565,627

COPRECIPITATED SILICA-MAGNESIA GEL

James N. Pryor, Baltimore, Md., assignor to The Davison Chemical Corporation, Baltimore, Md.

Application April 5, 1946, Serial No. 659,675

3 Claims. (Cl. 252—452)

This invention relates in general to the manufacture of magnesia-silica catalyst and more particularly has reference to a method of incorporating magnesia in silica gel during the normal course of preparation of the silica gel.

Magnesia-silica combinations, especially as used in catalysts, have been prepared heretofore by various methods. One method has been to incorporate powdered calcined magnesia with washed hydrogel by a mulling procedure and then drying and activating the final product.

Magnesia-silica catalyst has also been prepared by impregnating washed silica hydrogel with magnesium sulphate solution and then precipitating magnesia in the silica hydrogel by the action of ammonia on the sulphate solution, followed by washing the impregnated hydrogel, drying and activating the same.

Still another method of preparing a magnesia-silica catalyst involves the introduction of a magnesium sulphate solution into a freshly made silica hydrosol prior to setting thereof, allowing the impregnated sol to set to a hydrogel, ammoniating the set product to precipitate the magnesia, and finally washing, drying and activating the product obtained. The magnesia-silica combinations prepared according to the above described prior art methods, especially when used for catalytic purposes, have drawbacks from the standpoint of heat stability, steam stability and sometimes mechanical strength.

An object of this invention is to provide an improved method of preparing a magnesia-silica catalyst.

Another object of this invention is to provide a method of preparing a magnesia-silica catalyst by reacting a slurry of magnesia in an alkali metal silicate solution and an inorganic acid.

Still another object of this invention is to provide a method of making an improved magnesia-silica catalyst for the conversion of hydrocarbons.

A still further object of this invention is to prepare a magnesia-silica catalyst by forming a slurry of magnesia in an alkali metal silicate solution and reacting the slurry with an inorganic acid under conditions to produce a magnesia-silica hydrosol of low excess acidity and then converting the so produced hydrosol into a hydrogel.

With these and other objects in view which will appear more fully hereinafter, the present invention comprises the formation of a slurry of magnesium oxide in an alkali metal silicate solution such as sodium silicate solution, and the reaction of said slurry with an inorganic acid under conditions to produce a magnesia-silica catalyst in the form of a hydrosol of low excess acidity and yet avoid precipitation of silica, gelling the magnesia-silica hydrosol, washing the so produced hydrogel with substantially neutral water and then drying and activating the same.

In order to facilitate an understanding of the present invention, reference is made to the accompanying drawing in which:

The single figure is a flow sheet diagrammatically illustrating apparatus for carrying out the present invention, and the flow of reactants through said apparatus to produce a magnesia-silica catalyst.

It has been found in accordance with the present invention that a magnesia-silica combination suitable for use as a catalyst in the catalytic conversion of hydrocarbons may be prepared by first mixing magnesium oxide in powdered form with an alkali metal silicate solution such as sodium silicate solution to form a slurry and then reacting this slurry with an inorganic acid. It is preferable to effect the mixing of the magnesium oxide-alkali metal silicate solution slurry with the inorganic acid in a mixing nozzle as described in copending application Serial No. 628,724, now Patent No. 2,466,842 filed November 15, 1945 so that a hydrosol of magnesia and silica can be produced without precipitation of silica and yet the excess acidity of the hydrosol be maintained at a low value.

In carrying out the present invention, equipment such as diagrammatically illustrated in the drawings is employed. As indicated, a sodium silicate solution contained in the vessel or other source of supply 1 is run into a mixing tank 2 through a valve controlled outlet 3. Finally divided magnesium oxide such as a medium calcined material which, for example, analyzes about 91–92% MgO, 2–3% water and the balance impurities as lime, soda, etc., is introduced into the tank 2. Mixing of the magnesium oxide with the sodium silicate is effected by the agitator 4 to produce a slurry of magnesium oxide in the alkali metal silicate solution.

The slurry of magnesium oxide in the alkali metal silicate solution is pumped through a flow line 5 and through a rotameter into a mixing nozzle 6. Simultaneously, an inorganic acid such as sulphuric acid is pumped from a tank or suitable supply vessel 7 through a supply line 8 and through a rotameter into the mixing nozzle 6. In the nozzle 6 the acid and the slurry of magnesium oxide in the alkali metal silicate solution are thoroughly mixed to produce a magnesia-silica hydrosol. As illustrated in the drawings, a receiver 9 is positioned to receive the magnesia silica hydrosol discharged from the mixing nozzle 6. The magnesia-silica hydrosol collected in the receiver 9 is discharged into a hydrosol surge tank 10 from which it is conducted by means of a flexible conduit or hose 11 to one or more setting tubs 12.

Hydrosol fed into the setting tubs is allowed to remain therein for a sufficient time to effect gellation thereof. Subsequently, after gellation has been completed, the hydrogel produced in the setting tubs is removed therefrom, broken into fragments of optimum size and washed to remove the soluble reaction products therefrom. The so produced and washed hydrogel is then dried and activated for use as a catalyst.

In accordance with the present invention, a magnesia-silica catalyst containing approximately 65% $SiO_2$, 35% MgO and 2% impurities was made by first diluting a 40° Bé. solution of sodium silicate of 3¼:1 silica: soda ratio with water in the proportions of 140 lbs. of 40° Bé. sodium silicate to 90 lbs. of water. To this solution in the mixing vessel 2, there was added 27 lbs. of finely divided magnesium oxide of a medium calcined form which analyzed about 91–92% MgO, 2–3% water and the balance impurities as lime, soda, etc. After agitation, a slurry of the magnesium oxide in the sodium silicate solution was produced. This slurry was pumped to the mixing nozzle 6 together with about 117 lbs. of sulphuric acid of 21° Bé. at 120° F. The magnesia-sodium silicate slurry had a gravity of 33° Bé. at 85° F. In carrying out the reaction, the magnesium oxide in the sodium silicate solution slurry was pumped to the mixing nozzle at a temperature of about 85° F. and at a rate of flow of about 6 g. p. m. On the other hand, the acid at a temperature of 120° F. was fed to the mixing nozzle at a rate of 3 g. p. m. The ratio of acid to slurry was such as to produce a hydrosol of less than about ½ normal excess acidity but high enough to avoid precipitation of silica.

The magnesia-silica hydrosol was collected, and after being allowed to set in the setting tubs, was removed, washed with water having a pH value of 7–8 to avoid loss of the magnesia. This product was dried to a moisture content of about 10–15% and then activated at a temperature of about 1250° F. The so produced magnesia-silica catalyst was found to have heat and steam stability and to have a mechanical strength greater than that of magnesia-silica catalysts of the prior art. In addition, the product was found to be effective for use as a catalyst in the conversion of hydrocarbons for the production of gasoline.

It is understood in this application wherever reference is made to an inorganic acid that under certain conditions an organic acid or acid mixture may be employed.

While a specific example of the preparation of a magnesia-silica catalyst has been described, it is, of course, understood that the present invention is not limited to the details set forth in the example, but only by the scope of the appended claims.

I claim:

1. A method of preparing a magnesia-silica catalyst comprising mixing magnesium oxide with an alkali metal silicate solution and then mixing the slurry of magnesium oxide-alkali metal silicate solution with an inorganic acid to form a magnesia-silica hydrosol, then gelling the so formed hydrosol, washing the resulting gel, and drying and activating the washed gel.

2. A method of preparing a magnesia-silica catalyst comprising mixing finely divided magnesium oxide with a sodium silicate solution to form a slurry and then mixing the so formed slurry with sulphuric acid to form a magnesia-silica hydrosol of low excess acidity, gelling the hydrosol, washing the gel and drying and activating the resultant product.

3. A method of preparing a magnesia-silica catalyst comprising mixing finely divided magnesium oxide with a sodium silicate solution to form a slurry and then mixing the so formed slurry with sulphuric acid to form a magnesia-silica hydrosol of low excess acidity, gelling the hydrosol, washing the gel with neutral water, and drying and activating the resultant product.

JAMES N. PRYOR.

REFERENCES CITED

The following references are of record in the file of this patent:

UNITED STATES PATENTS

| Number | Name | Date |
|---|---|---|
| 2,323,728 | Ruthruff | July 6, 1943 |
| 2,384,944 | Marisic | Sept. 18, 1945 |
| 2,390,556 | Ruthruff | Dec. 11, 1945 |